United States Patent
Tanaka et al.

(10) Patent No.: US 6,744,558 B2
(45) Date of Patent: Jun. 1, 2004

(54) BACK FACE TRANSMISSION SCREEN

(75) Inventors: Koji Tanaka, Saitama (JP); Kazumi Kuroda, Fujimi (JP); Yoshio Wakabayashi, Kawaguchi (JP); Tatsufumi Fukuda, Ageo (JP)

(73) Assignee: Arisawa Mfg. Co., Ltd., Niigata-ken (JP)

( * ) Notice: Subject to any disclaimer, the term of this patent is extended or adjusted under 35 U.S.C. 154(b) by 0 days.

(21) Appl. No.: 10/221,310

(22) PCT Filed: Jan. 11, 2002

(86) PCT No.: PCT/JP02/00144
§ 371 (c)(1),
(2), (4) Date: Sep. 11, 2002

(87) PCT Pub. No.: WO02/056112
PCT Pub. Date: Jul. 18, 2002

(65) Prior Publication Data
US 2003/0107803 A1 Jun. 12, 2003

(30) Foreign Application Priority Data
Jan. 11, 2001 (JP) .......................................... 2001-037690

(51) Int. Cl.[7] .............................................. G03B 21/56
(52) U.S. Cl. ...................................................... 359/460
(58) Field of Search ................... 350/443, 460, 350/461, 457

(56) References Cited

U.S. PATENT DOCUMENTS 4,739,567 A * 4/1988 Cardin ........................ 359/461
5,337,179 A * 8/1994 Hodges ....................... 359/443
5,513,036 A   4/1996 Watanabe et al.
6,359,732 B1 * 3/2002 Yoshimura .................. 359/460

FOREIGN PATENT DOCUMENTS

| JP | 62-229122 A | 10/1987 |
| JP | 3-194531 A | 8/1991 |
| JP | 4-287033 A | 10/1992 |
| JP | 8-171137 A | 7/1996 |
| JP | 09033856 | 7/1997 |
| JP | 11-338056 A | 12/1999 |
| JP | 2000-206620 A | 7/2000 |

* cited by examiner

Primary Examiner—Christopher Mahoney
(74) Attorney, Agent, or Firm—Birch, Stewart, Kolasch & Birch, LLP

(57) ABSTRACT

A rear-projection screen is formed by adhesively bonding a front transparent sheet (2f) to the front surface of a transparent plate (3) on a viewing side (A), and adhesively bonding a wide-angle diffusing sheet (2r) to the rear surface of the transparent plate (3) on an image-projecting side. The front transparent sheet (2f) is provided in its front surface with a plurality of horizontal, parallel, minute ridges (4) having a triangular cross section. A side surface facing up or down of the two side surfaces of each minute ridge (4) is coated with a shading film (5), and the other side surface is transparent. The surface on the viewing side of the rear-projection screen does not reflect images even in a bright environment and are capable of displaying high-definition images having a high black level. The rear-projection screen can be used for forming a large screen.

10 Claims, 10 Drawing Sheets

BACK FACE TRANSMISSION SCREEN

This application is the national phase under 35 U.S.C. § 371 of PCT International Application No. PCT/JP02/00144 which has an International filing date of Jan. 11, 2002, which designated the United States of America.

TECHNICAL FIELD

The present invention relates to a rear-projection screen that receives an image projected from behind on its back surface and displays the projected image on its front surface on the viewing side.

BACKGROUND ART

There are rear-projection screens of different types to be disposed in a show window or behind a windowpane to display an image projected thereon by a projector. A known rear-projection screen is formed by applying a diffusing plate, a light interference hologram sheet or a liquid crystal shutter to a glass plate. An image is projected from inside on this rear-projection screen to display the image. Another known rear-projection screen is formed by sandwiching a hologram sheet between transparent glass plates or transparent acrylic resin plates. An image is projected on this rear-projection screen by a projector. These known rear-projection screens are used practically for displaying guidance images, advertisement images and video information. Some known semitransparent screen permits seeing a space behind the semitransparent screen on the side of a projector while images projected on the semitransparent screen by the projector are displayed on the semitransparent screen.

All those known rear-projection screens are incapable of displaying images surpassing the intensity of reflected images and external light reflected from a surface of the screen on the viewing side. Consequently, images, as viewed from the viewing side, have low contrast and are unclear.

A hologram type rear-projection screen, however, places a severe restriction on the range of angle of projection of images by a projector, such as a narrow range about 35°, and permits the use of only projectors capable of effectively correcting trapezoidal distortion. If vertical viewing angle exceeds 20° and horizontal viewing angle exceeds 30°, chromatic dispersion of the colors of images displayed on the hologram type rear projection screen occurs and makes the images unclear. Moreover, it is very difficult to form a large hologram type rear-projection screen.

Large display screens provided with LED lamps spread all over a display area have been widely used. However, the conventional large display screens are expensive and require troublesome work for installation.

Accordingly, it is an object of the present invention to provide a novel rear-projection screen not reflecting ambient scenery in its surface on the viewing side even in a bright environment, and capable of displaying high-definition images having a high black level and of forming a large screen at a low cost.

DISCLOSURE OF THE INVENTION

According to a first aspect of the present invention, a rear-projection screen comprises: a transparent plate having a rear surface on an image-projecting side, and a front surface on a viewing side; a front transparent sheet applied to the front surface of the transparent plate; and a wide-angle diffusing sheet applied to the rear surface of the transparent plate; wherein the front transparent sheet is provided in its front surface with a plurality of horizontal, parallel, minute ridges having a triangular cross section, a side surface facing up or down of two side surfaces of each minute ridge having a triangular cross section is coated with a shading film, and the other side surface is transparent.

The transparent plate may be a transparent windowpane of a building, the viewing side is on the outer side of the transparent plate, and the image-projecting side is on the inner side of the transparent plate.

The transparent sheet and the wide-angle diffusing sheet may be formed of flexible materials, and surfaces of the transparent sheet and the wide-angle diffusing sheet facing the transparent plate may be adhesive.

According to a second aspect of the present invention, a rear-projection screen comprises: a front transparent sheet having a front surface on a viewing side provided with a plurality of horizontal, parallel, minute ridges each having a triangular cross section, a side surface facing up or down and coated with a shading film and a flat rear surface on an image-projecting side; and a wide-angle diffusing sheet applied to the flat rear surface of the front transparent sheet.

The front transparent sheet and the wide-angle diffusing sheet may be formed of flexible materials, and the rear-projection screen can be rolled in a roll.

The front transparent sheet and the wide-angle diffusing sheet may be formed in a desired plane shape, and may be moved to and installed at an optional position.

BEST MODE FOR CARRYING OUT THE INVENTION

Figure 1:
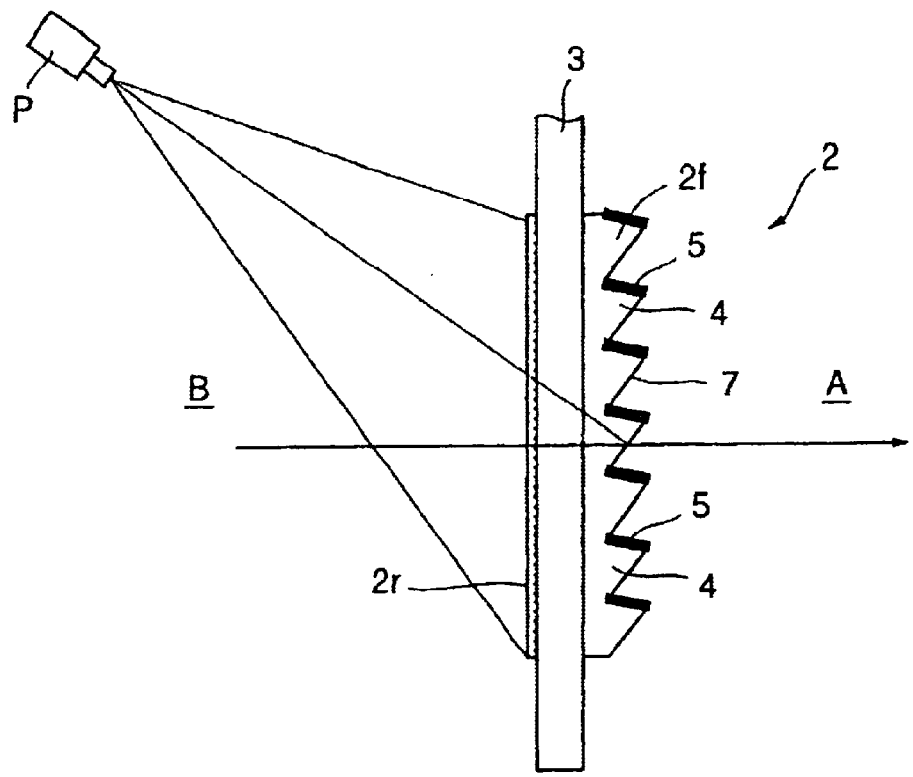
FIG. 1 is a longitudinal sectional view of a rear-projection screen in a first embodiment according to the present invention.
Figure 2:
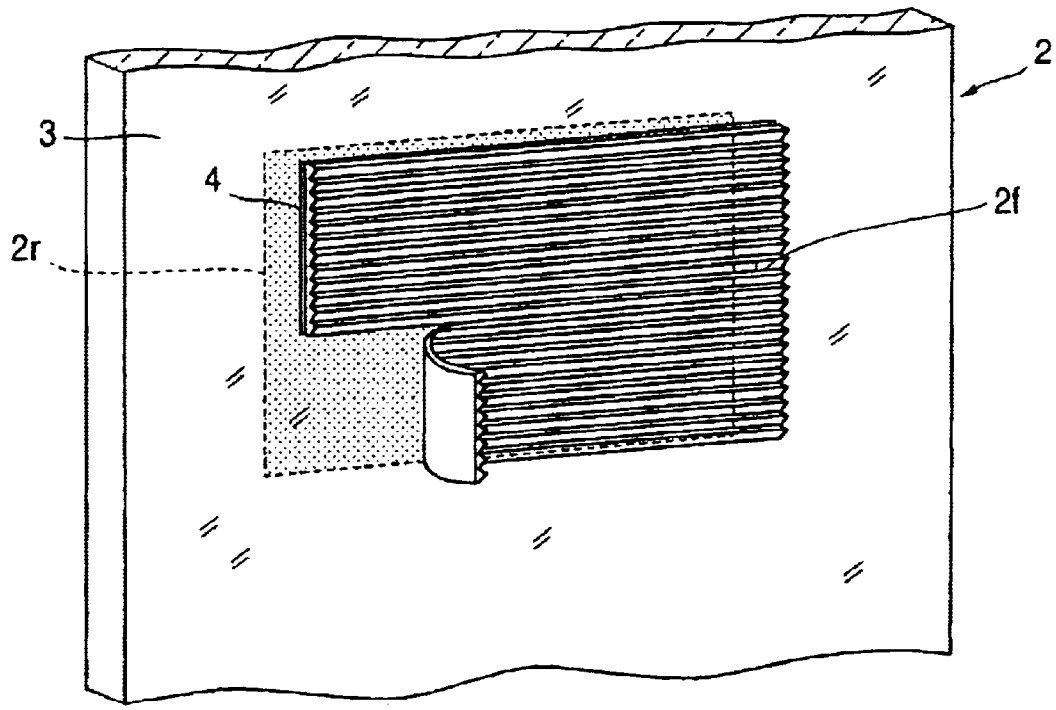
FIG. 2 is a perspective view of the rear-projection screen shown in FIG. 1.

Referring to FIGS. 1 and 2, a rear-projection screen 2 in a first embodiment according to the present invention includes a transparent plate 3, only part of which is shown, such as a windowpane of a building or the glass plate of a show window, a front transparent sheet 2$f$ applied to the front surface of the transparent plate 3 on a viewing side A, a wide-angle diffusing sheet 2$r$ applied to the rear surface of the transparent plate 3 on an image-projecting side B. An image projector P, such as a data projector, a video projector or the like, is disposed on the image-projecting side B to project an image on the wide-angle diffusing sheet 2$r$. The image thus projected on the wide-angle diffusing sheet 2$r$ is viewed on the viewing side A.

Figure 3:
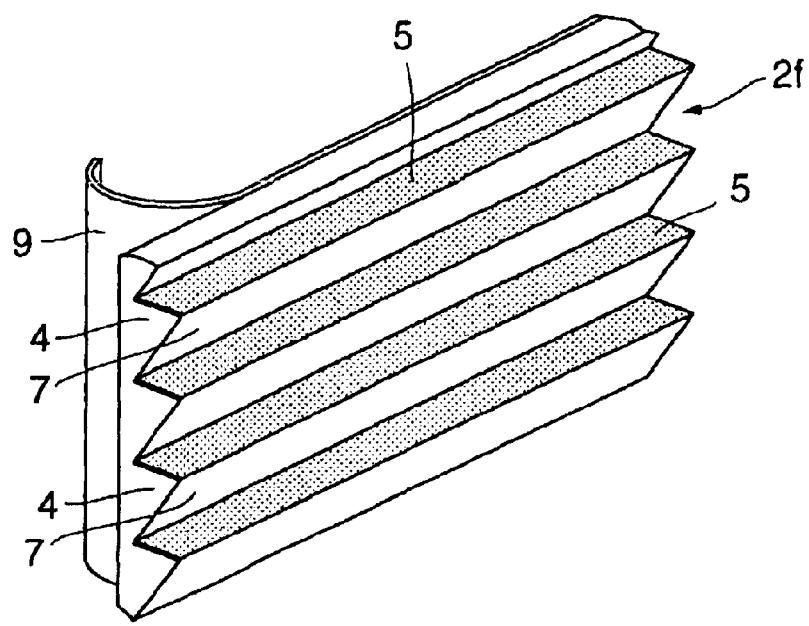
FIG. 3 is a perspective view of a front transparent sheet.
Figure 4:
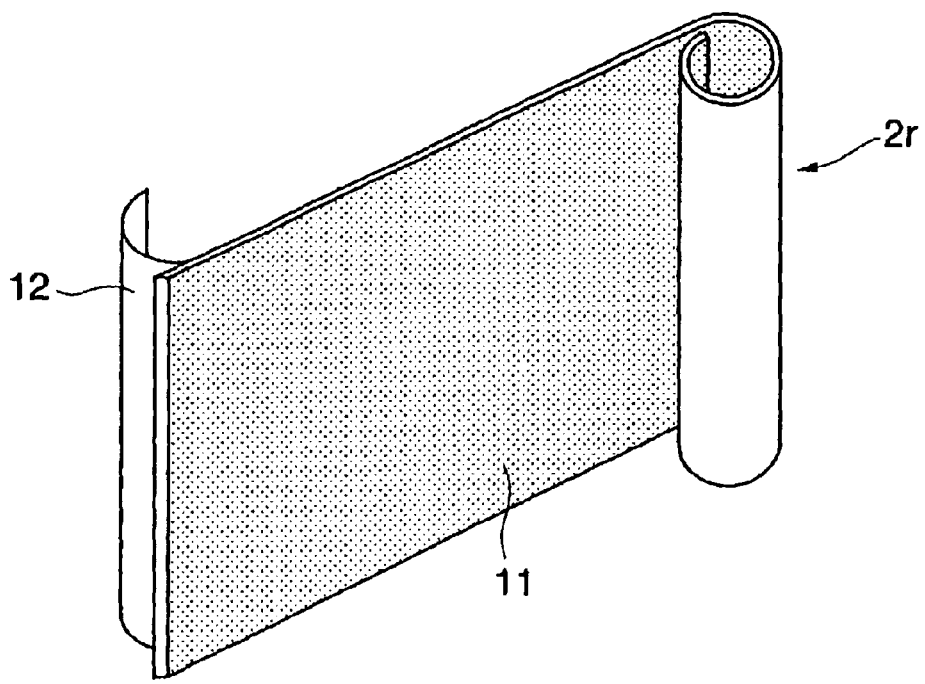
FIG. 4 is a perspective view of a wide-angle diffusing sheet.

The front transparent sheet 2$f$ is formed of, for example, a urethane resin. As best shown in FIG. 3, the front transparent sheet 2$f$ is provided in its front surface with a plurality of horizontal, parallel, minute ridges 4 having a triangular cross section. An upper side surface, i.e., a side surface facing up, of the two side surfaces of each minute ridge 4 having a triangular cross section is coated with a shading film 5. The upper surface coated with the shading film 5 maybe either a horizontal surface or an inclined surface slightly sloping down forward as shown in FIG. 1. Most preferably, the shading film 5 is a black film. A lower side surface 7, i.e., the other one of the two side surfaces, of the minute ridge 4 having the triangular cross section is a comparatively steep inclined surface and is transparent. The minute ridges 4 are arranged at pitches on the order of 0.3 mm. Experiments proved that the front transparent sheet 2$f$ formed of a urethane resin underwent yellowing slightly and deformed scarcely when exposed to sunlight for three years, and that the front transparent sheet 2$f$ was excellent in weather resistance.

The front transparent sheet 2$f$ is generally flexible and can be rolled in a roll. The front transparent sheet 2$f$ has a flat rear surface coated with an adhesive layer. In a state before the front transparent sheet 2$f$ is applied to the transparent plate 3, the adhesive layer is covered with a release sheet 9. The release sheet 9 is peeled off to expose the adhesive layer and then the front transparent sheet 2$f$ is applied to the front surface of the transparent plate 3 as shown in FIGS. 1 and 2.

The wide-angle diffusing sheet 2$r$ is formed by bonding a surface layer having a roughened surface 11 to the front surface of a base film of a flexible resin, such as a polyethylene terephthalate sheet or a vinyl chloride sheet, and forming an adhesive layer on the rear surface of the base film. The adhesive layer of the wide-angle diffusing sheet 2$r$ is covered with a releasing sheet 12. The releasing sheet 12 is peeled off and the wide-angle diffusing sheet 2$r$ is bonded to the rear surface of the transparent plate 3 with the adhesive layer as shown in FIGS. 1 and 2. The wide-angle diffusing sheet 2$r$ can be rolled in a roll. The wide-angle diffusing sheet 2$r$ has a viewing angle of, for example, about 170°, and does not form hot spots. The adhesive layers of the front transparent sheet 2$f$ and the wide-angle diffusing sheet 2$r$ as manufactured are covered with the releasing sheets 9 and 12, respectively. The thickness of the wide-angle diffusing sheet 2$r$ including the adhesive layer is on the order of, for example, 120 μm. The wide-angle diffusing sheet 2$r$ may be a lenticular sheet provided with minute longitudinal (vertical) lenticular lenses.

Figure 5:
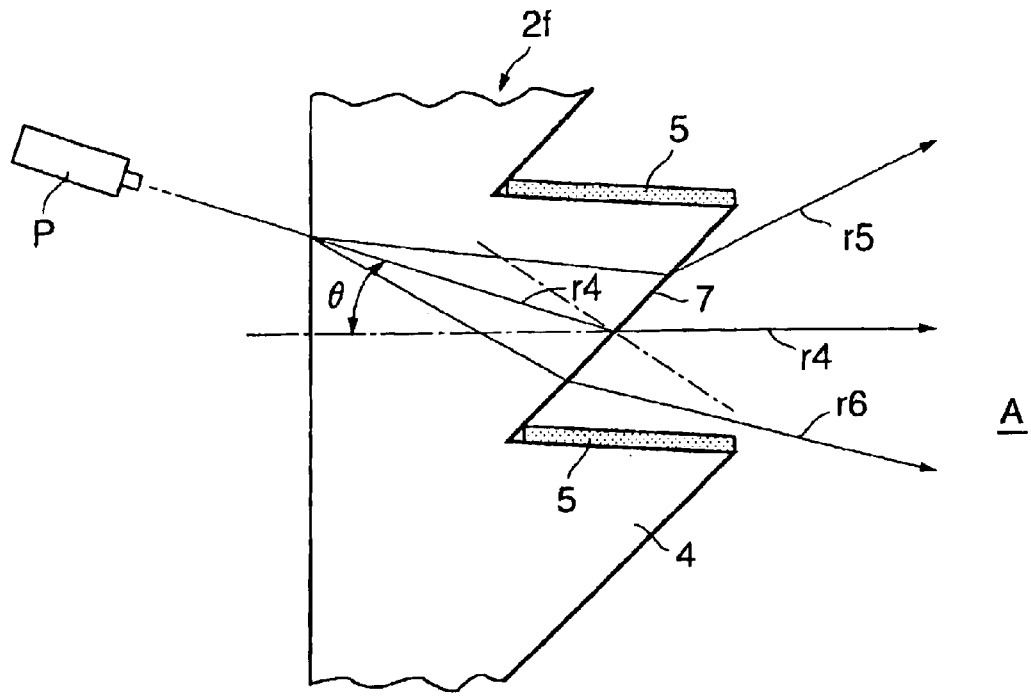
FIG. 5 is a view of assistance in explaining the function of a front transparent sheet when imaging light is projected obliquely from above on the rear surface of the front transparent sheet.

The function of the rear-projection screen 2 in the first embodiment will be described. FIG. 5 is a view of assistance in explaining the function of the front transparent sheet 2$f$ when an image is projected obliquely from above on the rear surface of the front transparent sheet 2$f$ by a projector P held on, for example, the ceiling. As shown in FIG. 1, imaging light projected by the projector P falls obliquely downward on the wide-angle diffusing sheet 2$r$, travels through the transparent plate 3 and, as shown in FIG. 5, falls obliquely downward on the front transparent sheet 2$f$ at an angle θ to a horizontal plane. The imaging light projected by the projector P and fallen on the wide-angle diffusing sheet 2$r$ forms an image on the wide-angle diffusing sheet 2$r$. The imaging light travels through the front transparent sheet 2$f$ in the direction of the arrow r4, and emanate from the front transparent sheet 2$f$ in the directions of the arrows r4, r5 and r6 on the viewing side A, i.e., on the side of the front surface of the rear-projection screen 2.

Figure 7:
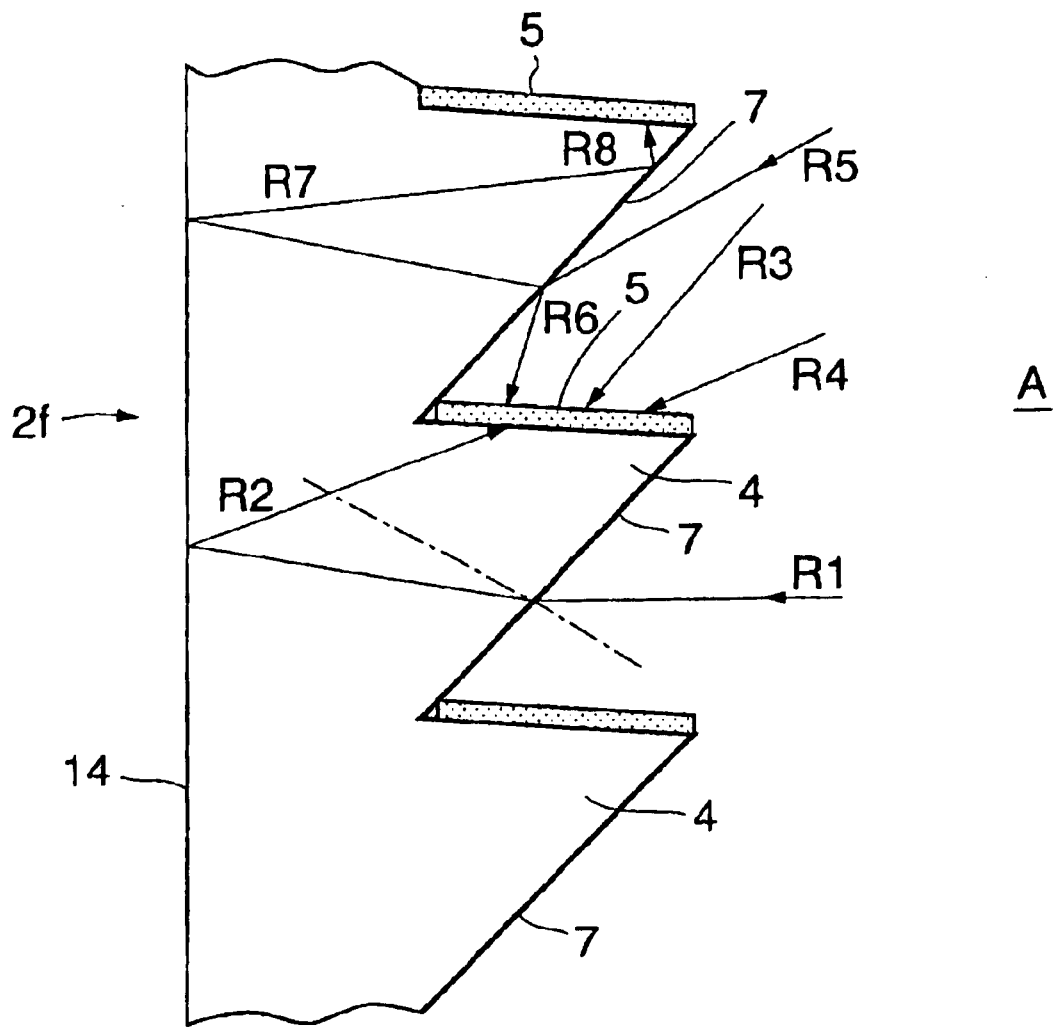
FIG. 7 is a view of assistance in explaining the function of the front transparent sheet when external light falls on its front surface.

FIG. 7 is a view of assistance in explaining the function of the front transparent sheet 2$f$ when external light falls thereon in a case where the rear surface 14 of the front transparent sheet 2$f$ is a reflecting surface. External light rays R1 fallen on the lower side surface 7 of the minute ridge 4 among those falling on the front transparent sheet 2$f$ from the viewing side A is reflected the reflecting rear surface 14, and reflected external rays R2 are absorbed by the shading film 5. External light rays R3 and R4 fallen on the shading film 5 are absorbed by the shading film 5. Other external light rays R5 are reflected by the lower side surface 7 of the upper minute ridge 4 in reflected external light rays R6 toward the shading film 5 of the lower minute ridge 4, and are absorbed by the shading film 5 of the lower minute ridge 4. External light rays R7 penetrated into the front transparent sheet 2$f$ among the external light rays R5 are reflected in a total reflection mode by the reflecting rear surface 14, and the reflected external light rays R8 are absorbed by the shading film 5. External light rays penetrated through the reflecting rear surface 14 and reflected by the surface behind the reflecting rear surface 14 are absorbed similarly. Thus, a very small part of the external light rays fallen on the rear-projection screen 2 is reflected by the front surface of the rear-projection screen 2. Thus, the minute ridges 4 having a triangular cross section absorb effectively not only light that falls obliquely from above the front surface of the rear-projection screen 2 on the viewing side A, but also light that falls from widely different directions on the front surface of the rear-projection screen 2. Consequently, the black level of the imaging light emerging from the lower side surfaces 7 on the viewing side A is improved, and an image having a satisfactory contrast can be displayed.

As obvious from the foregoing description, the front transparent sheet 2$f$ improves the quality of the image, the wide-angle diffusing sheet 2$r$ enables satisfactory viewing of an image displayed on the rear-projection screen from a direction at a large viewing angle.

Figure 6:
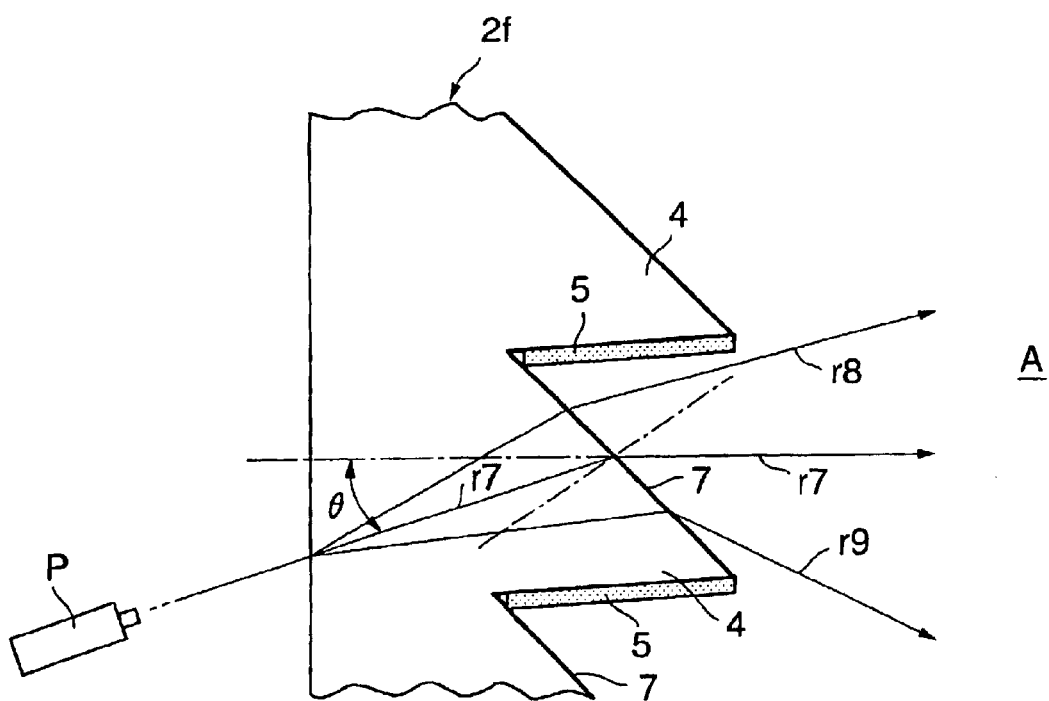
FIG. 6 is a view of assistance in explaining the function of a front transparent sheet when imaging light is projected obliquely from below on the rear surface of the front transparent sheet.

FIG. 6 shows a front transparent sheet 2$f$ having a shape vertically inverse to that of the front transparent sheet 2$f$ shown in FIG. 5. As shown in FIG. 6 the front transparent sheet 2$f$ is provided with minute ridges 4 having a triangular cross section, and the lower side surface of each minute ridge 4 is coated with a shading film 5, and the upper side surface 7 is transparent to permit imaging light to penetrate the upper side surface 7. When the rear-projection screen 2 is provided with the front transparent sheet 2f shown in FIG. 6, a projector P is installed, for example, on the floor, and hence imaging light falls on the wide-angle diffusing sheet 2r obliquely from below. The imaging light projected by the projector P falls obliquely upward at an angle to a horizontal plane on the wide-angle diffusing sheet 2r, travels through the transparent plate 3 and falls obliquely upward on the front transparent sheet 2f in a direction at an angle θ to a horizontal plane. The image light projected by the projector P forms an image on the wide-angle diffusing sheet 2r similarly to that forms the image on the wide-angle diffusing sheet 2r of the rear-projection screen 2 employing the front transparent sheet 2f shown in FIG. 5. As shown in FIG. 6, the imaging light travels through the front transparent sheet 2f in the direction of the arrow r7 and emanate from the front transparent sheet 2f in the directions of the arrows r7, r8 and r9 on the viewing side A, i.e., on the side of the front surface of the rear-projection screen 2. The wide-angle diffusing sheet 2r of the rear-projection screen 2 employing the front transparent sheet 2f shown in FIG. 6 is identical in construction and function with the wide-angle diffusing sheet 2r of the rear-projection screen 2 employing the front transparent sheet 2f shown in FIG. 5.

In the first embodiment described above, the front transparent sheet 2f has the adhesive layer formed on the back surface and covered with the release sheet 9, and the wide-angle diffusing sheet 2r has the adhesive layer formed on the front surface and covered with the release sheet 12. Therefore, the front transparent sheet 2f and the wide-angle diffusing sheet 2r can be readily and optionally applied to the front and the back surface, respectively, of the transparent plate 3, such as a windowpane of a building, simply by peeling off the release sheets 9 and 12. A large rear-projection screen can be easily formed by joining a plurality of front transparent sheet like the foregoing front transparent sheet 2f side to side, and joining a plurality wide-angle diffusing sheets like the foregoing wide-angle diffusing sheet 2r side to side. After peeling the release sheets 9 and 12 off the wide-angle diffusing sheet 2r and the front transparent sheet 2f, the wide-angle diffusing sheet 2r and the front transparent sheet 2f are subjected to a rolling process to remove air bubbles from the adhesive layers, water or activating agent is sprayed on the inner and the outer surface of the transparent plate 3, such as a windowpane, and then the wide-angle diffusing sheet 2r and the front transparent sheet 2f are applied to the inner and the outer surface of the transparent plate 3 so as to correspond to each other. Since the adhesive layers containing moisture slide easily, the front transparent sheet 2f and the wide-angle diffusing sheet 2r can be slid on the transparent plate 3 when applying the same to the transparent plate 3, and a plurality of front transparent sheets like the front transparent sheet 2f, and a plurality of wide-angle diffusing sheets like the wide-angle diffusing sheet 2r can be joined closely, respectively.

The front transparent sheet 2f and the wide-angle diffusing sheet 2r can be temporarily applied to the opposite surfaces of a windowpane or a partition glass plate, respectively, to construct a temporary screen for an event or a show. After the end of the event or the show, the windowpane or the partition glass plate can be restored to its original condition simply by peeling the front transparent sheet 2f and the wide-angle diffusing sheet 2r from the windowpane or the partition glass plate. Thus, a projection screen can be economically constructed and removed.

Figure 8:
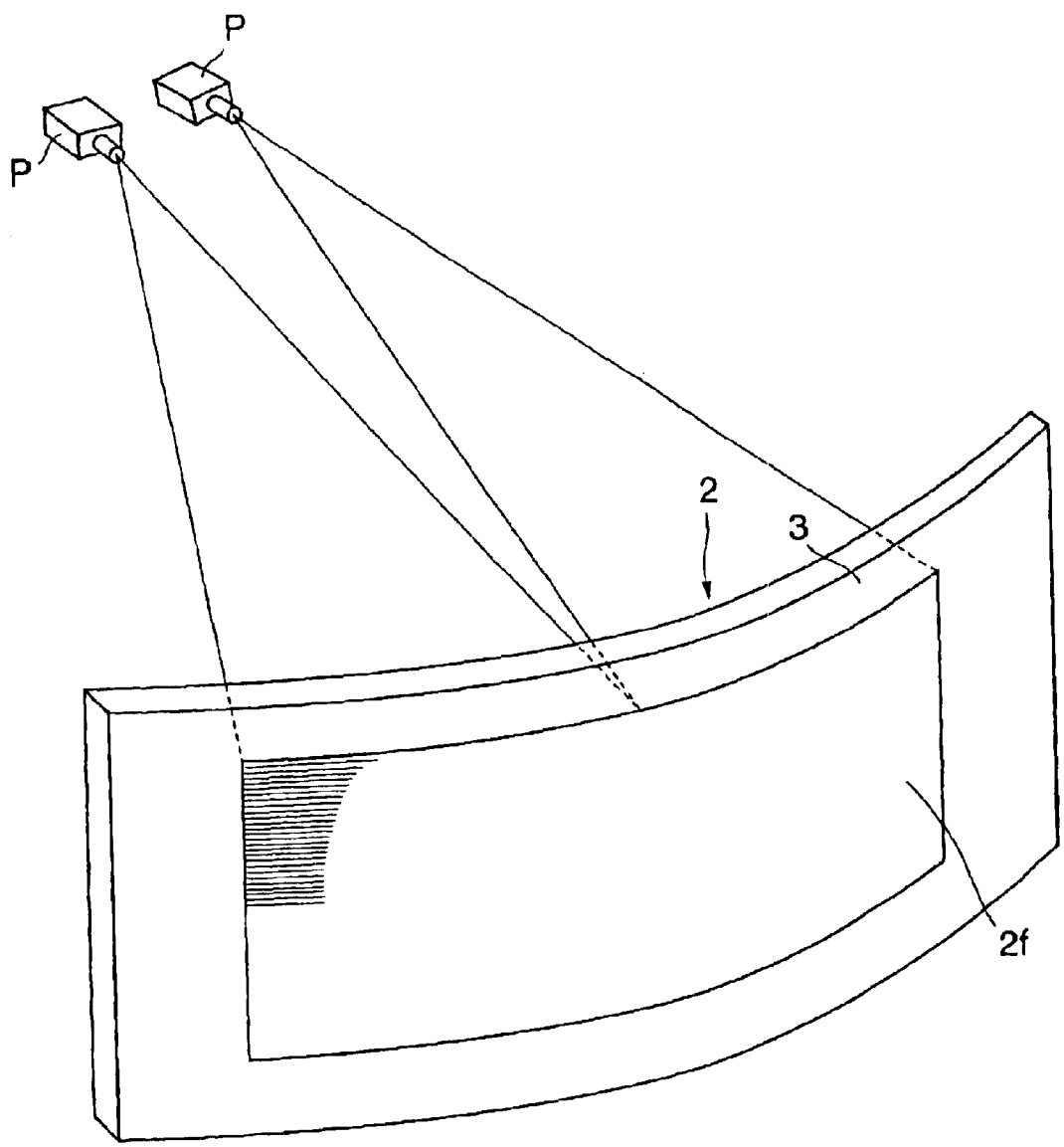
FIG. 8 is a perspective view of a curved rear-projection screen according to the present invention.

Being flexible, the front transparent sheet 2f and the wide-angle diffusing sheet 2r employed in the rear-projection screen 2 of the present invention can be applied to a transparent plate 3 of an optional shape as shown in FIG. 8 by way of example. The transparent plate 3 shown in FIG. 8 is curved in the shape of a circular arc. A plurality of front transparent sheets like the front transparent sheet 2f and a plurality of wide-angle diffusing sheets like the wide-angle diffusing sheet 2r are applied to the curved transparent plate 3 to form a large rear-projection screen. imaging light rays are projected on the large rear-projection screen by a plurality of projectors P. When the front transparent sheet 2f and the wide-angle diffusing sheet 2r are applied to the outer and the inner surface of a windowpane, respectively, scattering of glass fragments can be prevented even if the windowpane should be broken.

Figure 9:
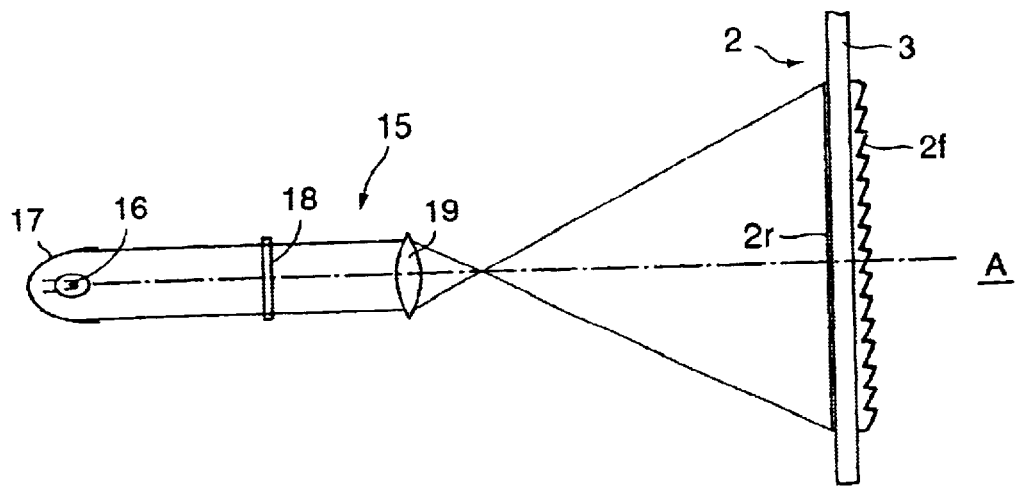
FIG. 9 is a side elevation of an image projector.

While any imaging light is not projected on the rear-projection screen 2 by the projector P, the rear-projection screen 2 looks dreary. An image projector 15 may be used in addition to the projector P as shown in FIG. 9 to avoid the rear-projection screen 2 looking dreary. As shown in FIG. 9, the image projector 15 is provided with a light source 16, such as an LED lamp, a reflector 17 disposed behind the light source 16, a picture film 18 and a lens 19. Light emitted by the light source 16 and reflected by the reflector 17 travels through the picture film 18 and the lens 19, and falls on the rear surface of the rear-projection screen 2. Thus, an image of a picture formed on the picture film 18 is displayed on the front surface of the rear-projection screen 2. The picture may be the name of a company, the name of a product or the like for publicity or advertisement. The picture is a still picture in the example shown in FIG. 9. A plurality of different still pictures may be displayed sequentially by turning a loop of a film provided with a plurality of pictures like a revolving lantern.

Figure 10:
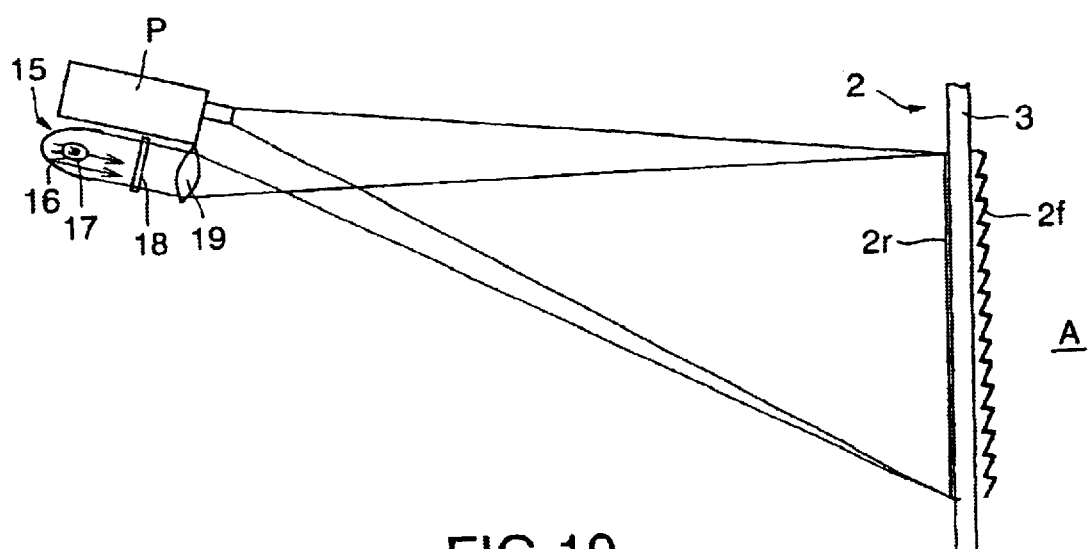
FIG. 10 is a side elevation of another image projector.

In an example shown in FIG. 10, an image projector 15 is disposed beside a projector P held on the ceiling. The image projector 15 and the projector P project images in the same direction. When the projector P stops, the stoppage of the projector P is detected automatically and the image projector 15 is actuated. The use of the image projector 15 in combination with the projector P enables the use of the rear-projection screen 2 as means for advertisement or as a security light.

Figure 11:
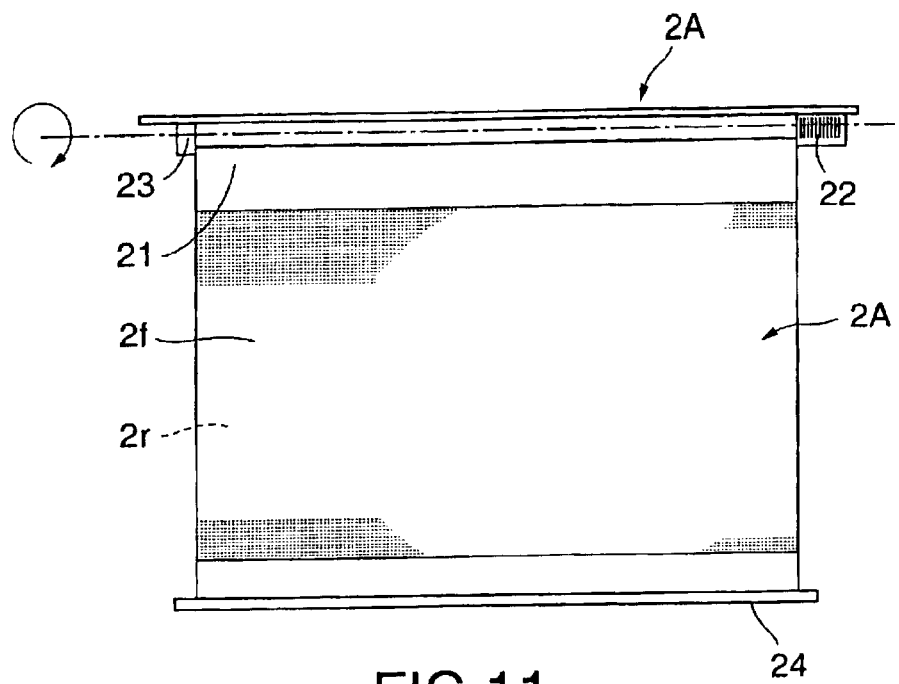
FIG. 11 is a front elevation of a rear-projection screen in a second embodiment according to the present invention.
Figure 12:
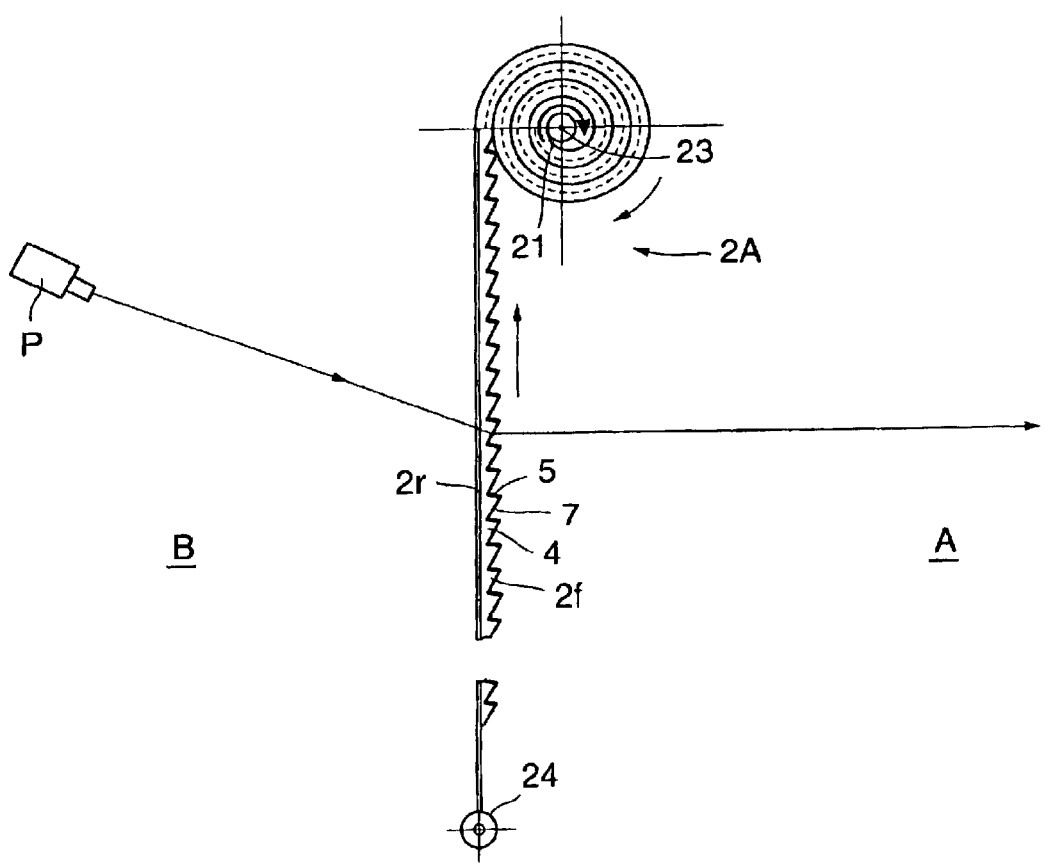
FIG. 12 is a side elevation of the rear-projection screen shown in FIG. 11.

FIGS. 11 and 12 show a rear-projection screen 2A in a second embodiment according to the present invention. Whereas the rear-projection screen 2 in the first embodiment shown in FIGS. 1 and 2 are formed by applying the front transparent sheet 2f to the front surface of the transparent plate 3 on the viewing side A, and applying the wide-angle diffusing sheet 2r to the rear surface of the transparent plate 3 on the image-projecting side B, the rear-projection screen 2A in the second embodiment shown in FIGS. 11 and 12 is formed by directly bonding together a front transparent sheet 2f on a viewing side A and a wide-angle diffusing sheet 2r on an image-projecting side, and is not provided with any member corresponding to the transparent plate 3; that is, a part of the front transparent sheet 2f facing the wide-angle diffusing sheet 2r serves as a transparent plate. The front transparent sheet 2f and the wide-angle diffusing sheet 2r are identical in construction with those of the first embodiment, respectively.

The rear-projection screen 2A, similarly to the rear-projection screen 2 in the first embodiment, is a flexible sheet. A leading sheet 21 of a polyethylene terephthalate resin is connected to one end of the rear-projection screen 2A. The rear-projection sheet 2A and the leading sheet 21 can be rolled in a roll. The free end of the leading sheet 21 is fastened to a take-up spool 23. The take-up spool 23 is urged in a winding direction to wind the leading sheet 21 by a spring 22. When the rear-projection screen 2A is rolled out, the rear-projection screen 2A is taken up on the take-up spool 23 unless the rear-projection screen 2A is restrained from being rolled. A weighting slat 24 is attached to the free end of the rear-projection screen 2A. The rear-projection screen 2A will not be rolled if the weight of the weighting slat 24 balances the winding force of the winding spring 22. The weighting slat 24 may be fixed at a specified position.

The take-up spool 23 of the rear-projection screen 2A is held on the ceiling or the like, and the weighting slat 24 is pulled down against the resilience of the winding spring 22 to roll out the rear-projection screen 2A as shown in FIGS. 11 and 12. The rear-projection screen 2A is kept stretched by the weight of the weighting slat 24. In this state, the rear-projection screen 2A is set with the front transparent sheet 2f facing the viewing side A and a projector P projects imaging light on the wide-angle diffusing sheet 2r.

Figure 13:
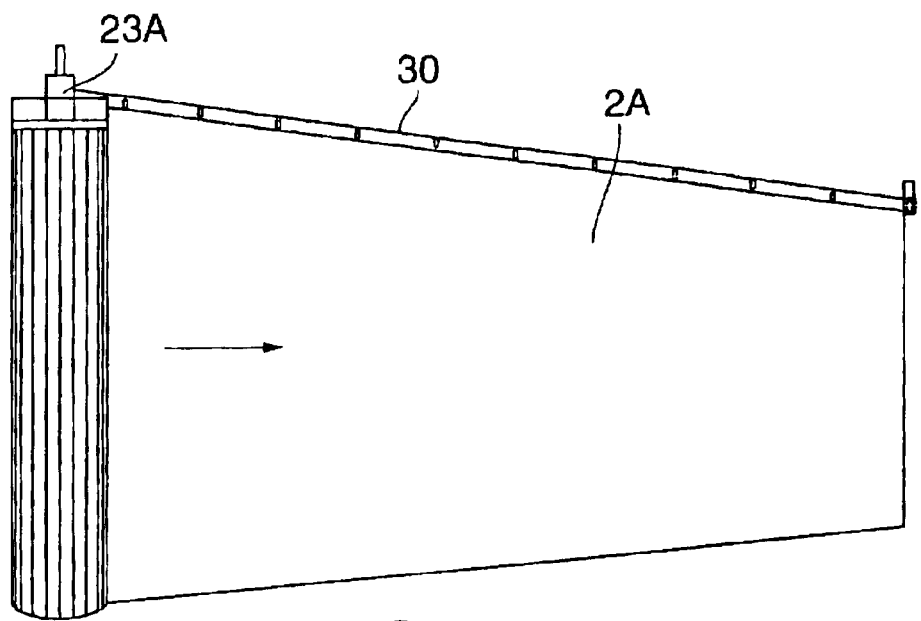
FIG. 13 is a perspective view of a rear-projection screen in a modification of the rear-projection screen shown in FIG. 11.
Figure 14:
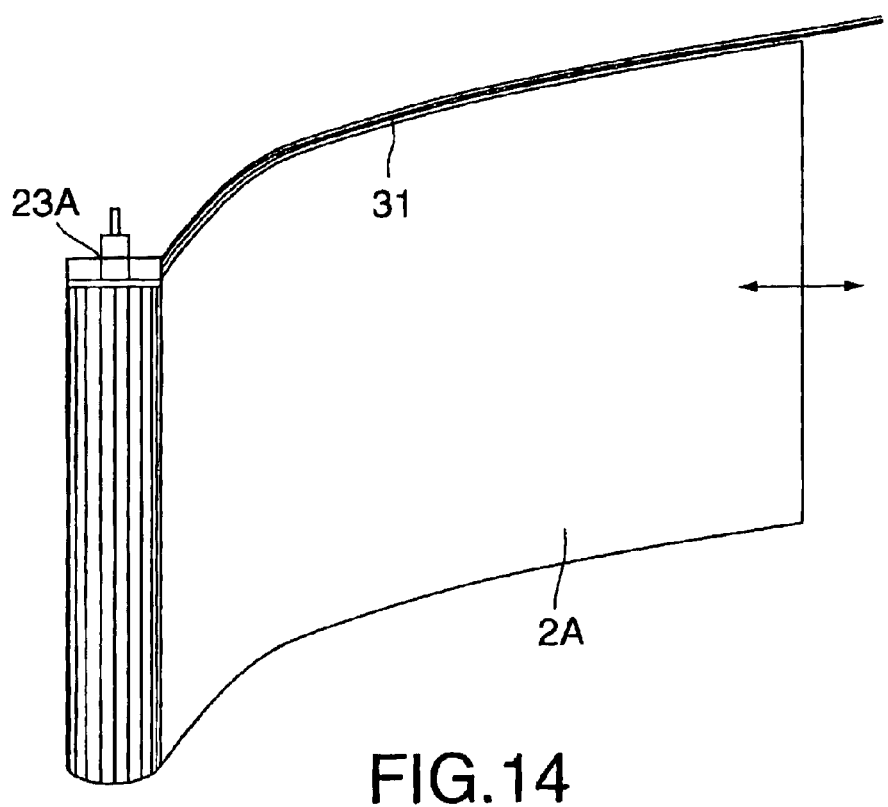
FIG. 14 is a perspective view of a rear-projection screen in another modification of the rear-projection screen shown in FIG. 11.

The rear-projection screen 2A in the second embodiment is unwound from the take-up spool 23 horizontally held at a high level and is pulled downward. The rear-projection screen 2A may be wound on a vertical take-up spool 23A and may be rolled out horizontally from the take-up spool 23A as shown in FIG. 13. A screen guide 30 connected to the take-up spool 23A is extended straight and horizontally, and the rear-projection screen 2A is extended along the screen guide 30 to maintain the planarity of the rear-projection screen 2A. A curved screen guide 31 may be connected to the take-up spool 23A and may be extended in a horizontal plane to extend the rear-projection screen 2A along the curved screen guide 31 as shown in FIG. 14.

Figure 15:
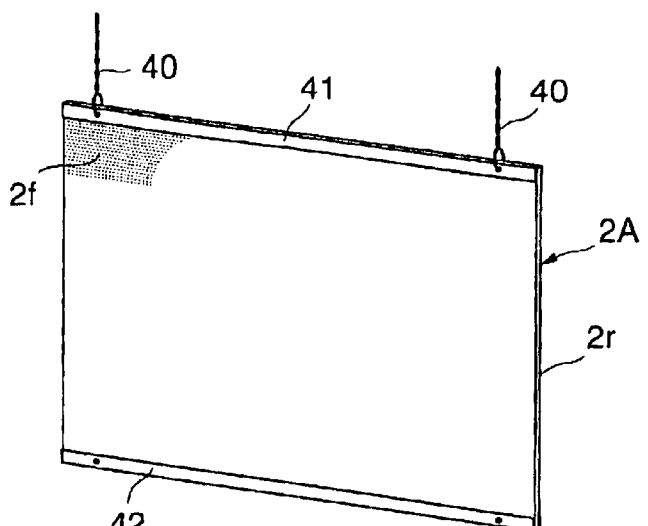
FIGS. 15 to 17 are perspective views of rear-projection screens in further modifications of the rear-projection screen shown in FIG. 11.

The rear-projection screen 2A having sectional construction shown in FIG. 12 may be formed in a rectangular shape and may be suspended from a holding member by suspenders 40, such as wires or chains, as shown in FIG. 15 instead of winding the rear-projection screen 2A on the take-up spool 23 or 23A and rolling out the same for use. Desirably, edge members 41 and 42 of, for example, aluminum are connected to the upper and the lower side of the rear-projection screen 2A, respectively, to keep the rear-projection screen 2A in its rectangular shape. The lower ends of the suspenders 40 are connected to the upper edge member 41. The lower edge member 42, similarly to the weighting slat 24 shown in FIG. 12, functions to keep the rear-projection screen 2A taut. The rear-projection screen 2A may be formed of inflexible, shape-retaining materials.

Figure 16:
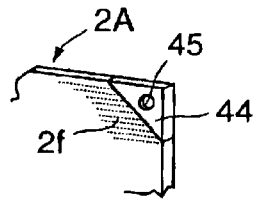

FIG. 16 shows another means for suspending the rear-projection screen 2A shown in FIG. 15. As shown in FIG. 16, suspension tabs 44 are attached to the upper right and left corners of the rear-projection screen 2A. The suspension tabs 44 are, for example, triangular and are provided with a hole 45 in which the suspender 40 is engaged. The rear-projection screen 2A shown in FIG. 16 in a modification of the rear-projection screen 2A in the second embodiment must be formed of inflexible, shape-retaining materials.

Figure 17:
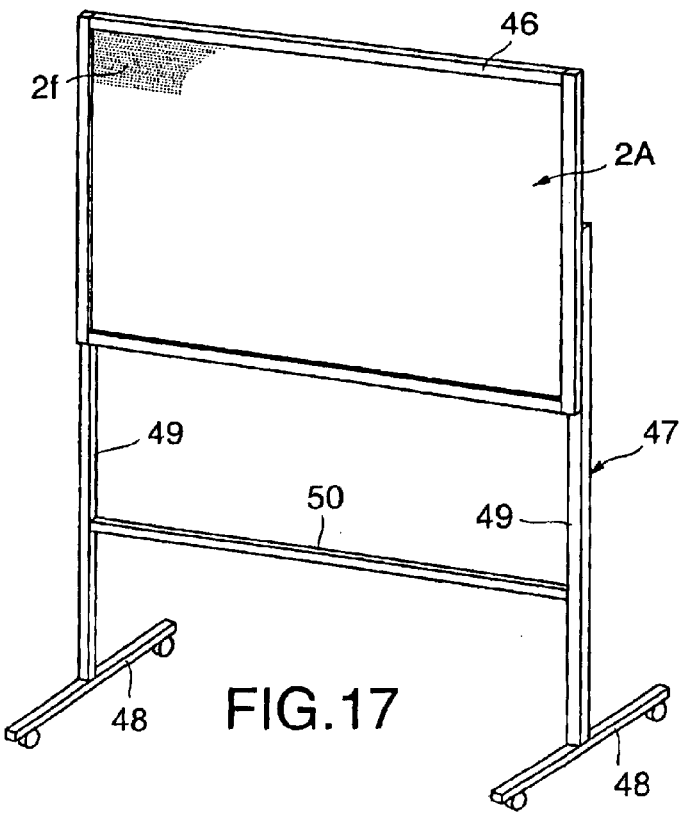

Referring to FIG. 17, a rear-projection screen 2A in another modification of the rear-projection screen 2A in the second embodiment is the same in construction as the rear-projection screen 2A shown in FIG. 12 and has a rectangular shape. The rear-projection screen 2A is set in a frame 46. The rear-projection screen 2A in this modification may be formed of either flexible materials or inflexible, shape-retaining materials. The rear-projection screen 2A set in the frame 46 is supported in a substantially vertical position by a support structure 47. The support structure 47 has a pair of foot members 48, a pair or legs 49 set upright on the foot members 48, respectively, and a crossbar 50 horizontally extended between the pair of legs 49. The frame 46 holding the rear-projection screen 2A is supported on the pair of legs 49 such that the height thereof is adjustable.

The rear-projection screens 2A in those modifications shown in FIGS. 15 to 17 are identical in optical functions and effects with the rear-projection screen 2A shown in FIGS. 11 and 12.

Figure 18:
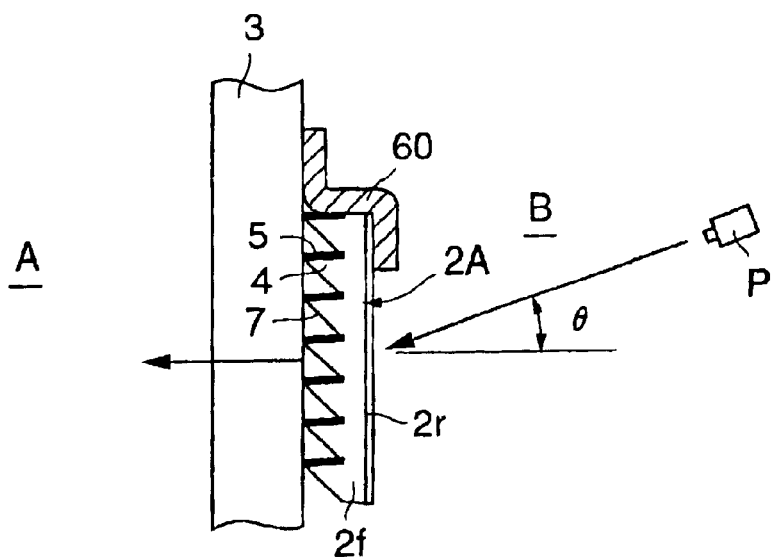
FIG. 18 is a longitudinal sectional view of a rear-projection screen in a still further modification of the rear-projection screen shown in FIG. 11.
Figure 19:
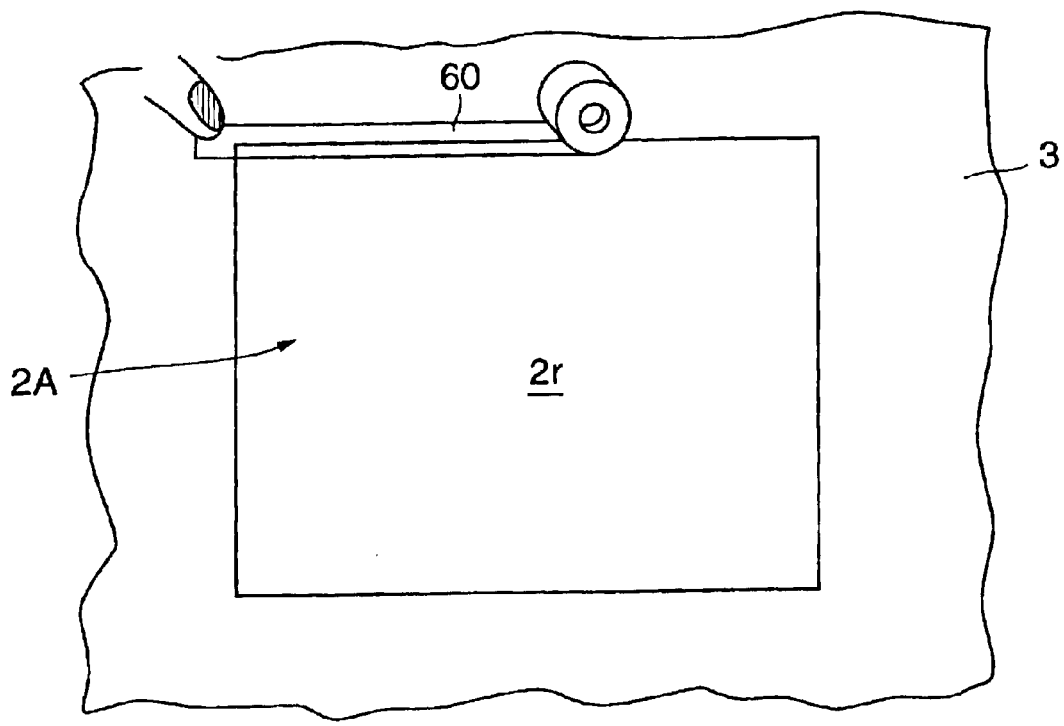
FIG. 19 is a front elevation of a rear-projection screen in a modification of the rear-projection screen shown in FIG. 18.

FIGS. 18 and 19 show a different method of attaching a rear-projection screen 2A identical with the rear-projection screen 2A shown in FIGS. 11 and 12 to a transparent plate 3, such as a glass plate of a show window, similar to that shown in FIGS. 1 and 2. The rear-projection screen 2A is attached to the rear surface on the image-projecting side B of the transparent plate 3. The rear-projection screen 2A has a front transparent sheet 2f and a wide-angle diffusing sheet 2r applied to the rear surface of front transparent sheet 2f. The front transparent sheet 2f, which is identical with the front tan sheet 2f shown in FIG. 3, is provided in its front surface with a plurality of horizontal, parallel, minute ridges 4 having a triangular cross section. One of the two side surfaces of each minute ridge 4 is coated with a shading film 5, and the other side surface is transparent.

This rear-projection screen 2A is attached to the transparent plate 3, such as the glass plate of a show window, with the front surface thereof provided with the minute ridges 4 having a triangular cross section facing the rear surface on the image-projecting side B of the transparent plate 3, i.e., the inner surface of the transparent plate 3, such as the glass plate of a show window. There are various possible attaching means for attaching the rear-projection screen 2A to the inner surface of the transparent plate 3. The attaching method shown in FIGS. 18 and 19 uses an adhesive tape 60. The adhesive tape 60 is applied to the inner surface of the transparent plate 3 along the four sides of the rear-projection screen 2A. The adhesive tape 60 is a preferable simple bonding means. The rear-projection screen 2A can be removed from the transparent plate 3 simply by peeling the adhesive tape 60 off the four sides of the rear-projection screen 2A. The rear-projection screen 2A is identical in optical functions and effects with the foregoing rear-projection screens. The rear-projection screen 2A attached to the inner surface of the transparent plate 3 is protected from the adverse effects of the external environment by the transparent plate 3.

The surfaces on the viewing side of the foregoing rear-projection screens according to the present invention do not reflect images and are capable of displaying high-definition images having a high black level and of forming a large screen in a short time at a low cost.

What is claimed is:

1. A rear-projection screen comprising:
    a transparent plate having a rear surface on an image-projecting side, and a front surface on a viewing side, the transparent plate being optically transparent;
    a front transparent sheet applied to the front surface of the transparent plate; and
    a wide-angle diffusing sheet applied to the rear surface of the transparent plate;
    wherein the front transparent sheet is provided in its front surface with a plurality of horizontal, parallel, minute ridges having a triangular cross section, a side surface facing up or down of two side surfaces of each minute ridge having a triangular cross section is coated with a shading film, and the other side surface is transparent, and wherein an entire face of the front transparent sheet is applied to the front surface of the transparent plate, and an entire face of the wide-angle diffusing sheet is applied to the rear surface of the transparent plate.

2. The rear-projection screen according to claim 1, wherein the front transparent sheet and the wide-angle diffusing sheet are formed of flexible materials, and surfaces of the transparent sheet and the wide-angle diffusing sheet facing the transparent plate are adhesive.

3. The rear-projection screen according to claim 1, wherein the transparent plate is a transparent windowpane of a building, the viewing side is on the outer side of the transparent plate, and the image-projecting side is on the inner side of the transparent plate.

4. The rear-projection screen according to claim 1, wherein the transparent plate is placed in a space and is movable.

5. The rear-projection screen according to claim 1, wherein a thickness of the wide-angle diffusing sheet is substantially less than a thickness of the transparent plate.

6. The rear-projection screen according to claim 1, wherein the transparent plate is curved in the shape of a circular arc.

7. The rear-projection screen according to claim 1, further comprising:

a leading sheet connected to one end of the rear-projection screen, wherein a free end of the leading sheet is fastened to a take-up spool.

8. A rear-projection screen comprising:

a front transparent sheet having a front surface on a viewing side provided with a plurality of horizontal, parallel, minute ridges each having a triangular cross section, a side surface facing up or down and coated with a shading film, and a flat rear surface on an image-projecting side; and a wide-angle diffusing sheet applied directly to the flat rear surface of the front transparent sheet without intervening with a transparent plate.

9. The rear-projection screen according to claim 8, wherein the front transparent sheet and the wide-angle diffusing sheet are formed of flexible materials, and the rear-projection screen can be rolled in a roll.

10. The rear-projection screen according to claim 8, wherein the front transparent sheet and the wide-angle diffusing sheet are formed in a desired plane shape, and can be moved to and installed at an optional position.

* * * * *